(12) United States Patent
Singh et al.

(10) Patent No.: US 10,895,224 B1
(45) Date of Patent: Jan. 19, 2021

(54) EXHAUST SYSTEM FOR INTERNAL COMBUSTION ENGINE AND CONDENSATE DISPOSAL STRATEGY FOR SAME

(71) Applicant: Caterpillar Inc., Deerfield, IL (US)

(72) Inventors: Jaswinder Singh, Dunlap, IL (US); Michael Bardell, Peoria, IL (US); David Ginter, Peoria, IL (US); Paul Wang, Peoria, IL (US); Patrick Seiler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/458,886

(22) Filed: Jul. 1, 2019

(51) Int. Cl.
| | | |
|---|---|---|
| *F01N 3/04* | (2006.01) | |
| *F02M 26/29* | (2016.01) | |
| *F02D 41/00* | (2006.01) | |
| *F02M 26/35* | (2016.01) | |
| *F02M 26/36* | (2016.01) | |
| *F01N 3/00* | (2006.01) | |
| *F01N 3/02* | (2006.01) | |

(52) U.S. Cl.
CPC ............ *F02M 26/29* (2016.02); *F01N 3/005* (2013.01); *F02D 41/0055* (2013.01); *F02M 26/35* (2016.02); *F02M 26/36* (2016.02); *F01N 3/0205* (2013.01); *F01N 2610/00* (2013.01)

(58) Field of Classification Search
CPC ... F02G 5/02; F01N 3/005; F01N 3/02; F01N 3/0205; F01N 3/038; F01N 3/04; F01N 2240/22; F01N 2260/024; F02M 26/35; F02M 26/36
See application file for complete search history.

(56) References Cited

U.S. PATENT DOCUMENTS

| | | | |
|---|---|---|---|
| 9,932,921 B2 | 4/2018 | Hoard et al. | |
| 2009/0205326 A1* | 8/2009 | Watson | F01N 3/005 60/309 |
| 2010/0242929 A1 | 9/2010 | Kardos et al. | |
| 2016/0305374 A1 | 10/2016 | Jayakar et al. | |
| 2016/0326992 A1 | 11/2016 | Keating | |
| 2018/0163672 A1* | 6/2018 | Seo | F02M 26/47 |

FOREIGN PATENT DOCUMENTS

| | | |
|---|---|---|
| EP | 2803836 B1 | 5/2016 |
| JP | 2011140922 A | 7/2011 |
| JP | 2015094290 A | 5/2015 |

* cited by examiner

*Primary Examiner* — Jonathan R Matthias
(74) *Attorney, Agent, or Firm* — Brannon Sowers & Cracraft

(57) ABSTRACT

An exhaust system for an internal combustion engine includes an EGR cooler having a heat exchange surface exposed to a flow of exhaust, and a second heat exchange surface. A coolant heat exchanger is fluidly connected to a coolant outlet of the EGR cooler and a coolant pump is fluidly connected to a coolant inlet of the EGR cooler. A condensate collector collects condensate from exhaust, and a condensate pump pumps condensate from the condensate collector to a sprayer to spray condensate onto the second heat exchange surface to vaporize the condensate for discharging out through an outgoing exhaust conduit of the exhaust system.

15 Claims, 2 Drawing Sheets

US 10,895,224 B1

EXHAUST SYSTEM FOR INTERNAL COMBUSTION ENGINE AND CONDENSATE DISPOSAL STRATEGY FOR SAME

TECHNICAL FIELD

The present disclosure relates generally to exhaust gas recirculation in an internal combustion engine system, and more particularly to disposing of condensate from recirculated exhaust gas.

BACKGROUND

A wide variety of exhaust system configuration and operation strategies are known in the internal combustion engine field. Most internal combustion engines produce exhaust having certain constituents it is desirable to trap, reduce, or treat in various ways. Particulate matter and oxides of nitrogen or "NOx" are notable examples of such exhaust constituents. Different engine types and operating strategies can produce different emissions profiles necessitating a diversity of exhaust treatment and engine operating strategies to produce optimal results.

One technique used to influence the amounts and proportions of various emissions includes exhaust gas recirculation where exhaust produced by operating an internal combustion engine is recirculated to an intake manifold of the engine and mixed with air and fuel combusted in the engine cylinders. Recirculated exhaust gas can act as an inert heat sink that can produce desirable results in the composition of the exhaust produced in the cylinders during combustion. Exhaust gas recirculation strategies are known from compression ignition diesel engines, spark-ignited gasoline engines, and spark- or prechamber-ignited gaseous fuel engines. In the case of gaseous fuel engines, it can be desirable to cool the recirculated exhaust, as high combustion temperatures can be associated with engine knock or other undesired phenomena relating to combustion. One product of combustion of hydrocarbons and certain other fuels is water. Cooling exhaust for recirculation can result in condensation of water from exhaust in the exhaust system. Engineers have encountered difficulties in cooling hot exhaust which can be at least several hundred degrees Celsius, and conventional strategies often employ a relatively large exhaust cooler and high coolant flows. Moreover, condensate generated during exhaust cooling can be difficult to dispose. Japanese Patent Publication No. JP2015094290A is directed to a control device for an internal combustion engine where water collected from exhaust is sprayed onto an outer peripheral face of an exhaust cooler. While this publication proposes a technique that might have certain applications, there is always room for improvement and alternative strategies in the field.

SUMMARY OF THE INVENTION

In one aspect, a method of operating an exhaust system for an internal combustion engine includes diverting exhaust produced by the internal combustion engine for recirculation, cooling the diverted exhaust, and collecting condensate from the cooled diverted exhaust. The method further includes spraying the collected condensate onto a heat exchange surface in a heat exchanger in the exhaust system, and vaporizing the collected condensate sprayed onto the heat exchange surface based on an exchange of heat between the collected condensate and diverted exhaust conveyed through the heat exchanger. The method further includes conveying the vaporized condensate into an outgoing exhaust conduit of the exhaust system for discharging.

In another aspect, an internal combustion engine system includes an exhaust gas recirculation (EGR) conduit, an outgoing exhaust conduit, and a heat exchanger having a first heat exchange surface exposed to a flow of exhaust through the EGR conduit, and a second heat exchange surface in heat transference communication with the first heat exchange surface. The internal combustion engine system further includes a condensate collector coupled to the EGR conduit to collect condensate from the exhaust, a sprayer structured to spray condensate from the condensate collector onto the second heat exchange surface, and a vapor conduit extending between a heat exchanger and the outgoing exhaust conduit to convey condensate vaporized on the second heat exchange surface to the outgoing exhaust conduit for discharging.

In still another aspect, an exhaust system for an internal combustion engine includes an exhaust gas recirculation (EGR) conduit, and an EGR cooler including an exhaust heat exchange surface exposed to a flow of exhaust through the EGR conduit, and a second heat exchange surface, a coolant inlet, and a coolant outlet. The exhaust system further includes a coolant heat exchanger fluidly connected to the coolant outlet, a coolant pump fluidly connected to the coolant inlet, and a condensate collector coupled to the EGR conduit to collect condensate from the exhaust. The exhaust system still further includes a sprayer structured to spray condensate from the condensate collector onto the second heat exchange surface to vaporize the condensate for discharging, and a condensate pump structured to pump condensate from the condensate collector to the sprayer.

DETAILED DESCRIPTION

Figure 1:
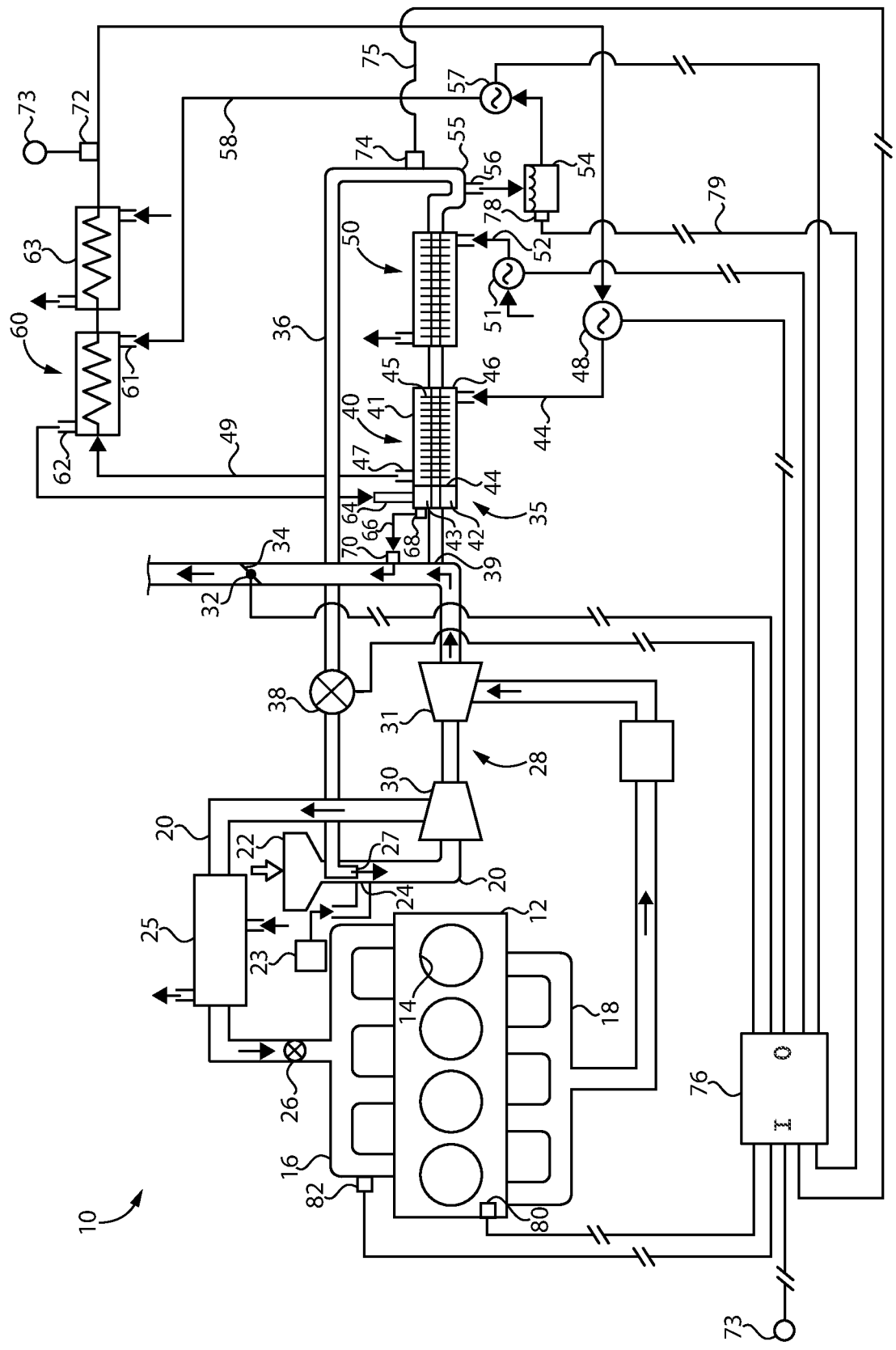
FIG. 1 is a diagrammatic view of an internal combustion engine system, according to one embodiment.

Referring to FIG. 1, there is shown an internal combustion engine system 10 according to one embodiment. Internal combustion engine system 10 (hereinafter "engine system 10") includes an engine housing 12 having a plurality of cylinders 14 formed therein. Cylinders 14 can include any number in any suitable arrangement. An exhaust manifold 18 is coupled to engine housing 12, as well as an intake manifold 16. An intake conduit 20 feeds fresh air for combustion by way of an air filter 22 to intake manifold 16, through a compressor 30 of a turbocharger 28 a charge air cooler 25 A throttle valve 26 is positioned fluidly between charge air cooler 25 and intake manifold 16. In the illustrated embodiment, engine system 10 is a gaseous fuel engine system structured to operate on a gaseous fuel such as natural gas, methane, ethane, blends of these, or a variety of other gaseous fuels having a gaseous state at standard temperature and pressure. Engine system 10 could also operate on gasoline, premixed gasoline fed to cylinders 14 in a gaseous state, or on diesel distillate fuel, for example. Engine system 10 could also be a dual liquid and gaseous fuel engine. A gaseous fuel supply 23 is structured to supply gaseous fuel into intake conduit 20 by way of a gaseous fuel inlet 24. A gaseous fuel admission valve (not shown) could be positioned at gaseous fuel inlet 24. It will be noted that gaseous fuel is supplied upstream of compressor 30, however, in other embodiments gaseous fuel could be supplied downstream of compressor 30, such as into intake runners feeding individual cylinders or into intake manifold 16. Gaseous fuel could also be directly injected. Also shown in FIG. 1 is an exhaust inlet 27 for feeding recirculated exhaust into intake conduit 20, as further discussed herein. Exhaust is fed from exhaust manifold 18 through a turbine 31 of turbocharger 28 and thenceforth to an outgoing exhaust conduit 32 A butterfly valve 34 may be positioned in outgoing exhaust conduit 32 vary, for example, exhaust back pressure to enable diverting or controlling diverting of exhaust into an exhaust gas recirculation ("EGR") conduit 36 by way of an exhaust inlet 39. An EGR valve 38 is positioned to enable controlling a supply of recirculated exhaust gas delivered into intake conduit 20 by way of exhaust inlet 27. EGR conduit 36 and EGR valve 38 are part of an exhaust system 35, features and functionality of which are further discussed herein.

Exhaust system 35 further includes a heat exchanger 40 structured to receive diverted exhaust by way of exhaust inlet 39. Heat exchanger 40 may include an EGR cooler such as a shell and tube EGR cooler. Heat exchanger 40 includes a housing 41 having a first heat exchange surface 42 exposed to a flow of exhaust through EGR conduit 36, and a second heat exchange surface 43. First heat exchange surface 42 may be understood as an exhaust heat exchange surface, and second heat exchange surface 43 can be understood as a condensate heat exchange surface further vaporizing condensate, as further discussed herein. Second heat exchange surface 43 is in heat transference communication with first heat exchange surface 42. First heat exchange surface 42 could be an inside surface of EGR conduit 36, whereas second heat exchange surface 43 could be an outside surface of EGR conduit 36. In such an embodiment the heat transference communication between first heat exchange surface 42 and second heat exchange surface 43 can be understood as primary heat transference communication, with heat transferred directly through material, such as metallic material, forming EGR conduit 36. In other embodiments, a different arrangement such as a secondary heat transference communication arrangement employing fins or the like could be used.

Within housing 41 is a barrier 44 that fluidly separates second heat exchange surface 43 from a plurality of fins or the like 45. Heat exchanger 40 further includes a coolant inlet 46 to housing 41, and a coolant outlet 47 from housing 41 enabling a flow of a liquid coolant through housing 41 to exchange heat with exhaust conveyed through EGR conduit 36 downstream of second heat exchange surface 43. Another way to understand construction of heat exchanger 40 is that heat exchange surfaces exposed to a flow of liquid coolant, on fins 45 for example, are fluidly separated from a flow of, and contact with, fluid contacting second heat exchange surface 43. Liquid coolant conveyed in a first control loop 49 through housing 41 exchanges heat with exhaust conveyed through EGR conduit 36. In other embodiments, heat exchanger 40 could be structured as a standalone unit where second heat exchange surface 43 is in a first heat exchanger separate from heat exchange surfaces associated with fins 45 in a second heat exchanger.

Exhaust cooled in heat exchanger 40 can be conveyed in a downstream direction to an EGR condenser 50. A first coolant pump 48 pumps coolant in first coolant loop 49 through heat exchanger 40. A second coolant pump 51 may pump coolant in a second coolant loop 52 through EGR condenser 50. First coolant loop 49 and second control loop 52 may be fluidly in parallel with one another, and could be entirely separate coolant systems, or parts of the same coolant system where coolant is pumped at a first temperature through heat exchanger 40 and at a second temperature through EGR condenser 50. Exhaust cooled in EGR condenser 50 may be conveyed in a downstream direction through a part of EGR conduit 36 structured to assist in collecting condensate from exhaust, such as a bend or the like 55. A condensate outlet 56 is coupled to bend 55 and conveys condensate, including mostly water, to a condensate collector 54. Condensate collector 54 is coupled to EGR conduit 36 to collect condensate from diverted exhaust cooled in heat exchanger 40 and in EGR condenser 50. Condensate collector 54 may include a tank.

A condensate pump 57 is provided and structured to pump condensate from condensate collector 54 to a sprayer 64 structured to spray condensate from condensate collector 54 onto second heat exchange surface 43. A condensate conduit 58 extends between condensate pump 57 and sprayer 64. A vapor conduit 66 extends between heat exchanger 40 and outgoing exhaust conduit 32 to convey condensate vaporized on second heat exchange surface 43 to outgoing exhaust conduit 32 for discharging. It will be appreciated then that liquid condensate can be vaporized to steam by spraying on to second heat exchange surface 43, and then passed in vapor form out of a condensate outlet 68 in housing 41, to condensate inlet 70 in outgoing exhaust conduit 32, and thenceforth into outgoing exhaust conduit 32 to be discharged mixed with whatever engine exhaust is to also be discharged. Outgoing exhaust conduit 32 could include an exhaust stack or a tailpipe, or potentially an exhaust conduit that feeds exhaust and vaporized condensate to aftertreatment components for subsequent exhaust treatment. In a practical implementation strategy, aftertreatment elements such as catalytic aftertreatment elements, could be positioned fluidly between turbine 31 and inlet 70 such that emissions outgoing to ambient through outgoing exhaust conduit 32 are not further treated.

Exhaust system 35 can further include a coolant heat exchanger 60 positioned fluidly between condensate pump 57 and sprayer 64. Condensate pump 57 can be structured to pump condensate from condensate collector 54 through coolant heat exchanger 60 to exchange heat with coolant pumped through coolant heat exchanger 60. It will be recalled heat exchanger or EGR cooler 40 includes a coolant inlet 46 and a coolant outlet 47. Coolant heat exchanger 60 may be fluidly connected to coolant outlet 47, and coolant pump 48 may be fluidly connected to coolant inlet 46. Another coolant heat exchanger 63 may be coupled with or positioned downstream of coolant heat exchanger 60. In this way, coolant having exchanged heat with exhaust in heat exchanger 40 can be pumped through first coolant loop 49 through coolant heat exchanger 60 to exchange heat with coolant that has exchanged heat with exhaust previously. The coolant that exchanges heat with condensate including heat exchanger 60 can then be conveyed through coolant heat exchanger 63 to exchange heat with additional coolant. Coolant pumped through coolant heat exchanger 63 may be coolant in second coolant loop 52, coolant in a third coolant loop, or some other arrangement. Coolant heat exchangers 60 and 63 could be shell and tube heat exchangers, finned tube radiators, or still another type of heat exchanger. From coolant heat exchanger 63 coolant in first control loop 49 can be conveyed back to first coolant pump 48. It will thus be appreciated that the exchange of heat between coolant in coolant heat exchanger 60 and condensate can be understood to precool or supplementarily cool coolant that is to be recirculated through heat exchanger 40.

Engine system 10 and exhaust system 35 further include controls enabling a temperature of recirculated exhaust gas to be varied for purposes of reducing or eliminating undesired combustion characteristics such as engine knock, or for other purposes. The controls for exhaust system 35 can further be structured to control the temperature of recirculated exhaust by exploiting control capability over coolant flow as well as control capability over condensate flow and spraying, based on coolant and condensate temperatures as well as condensate availability. To this end, engine system 10 and exhaust system 35 may further include a coolant temperature sensor 72 structured to produce a coolant temperature signal indicative of a temperature of coolant cooled in one or both of coolant heat exchangers 60 and 63. In the illustrated embodiment, coolant temperature sensor 72 is positioned downstream of coolant heat exchanger 63 in first coolant loop 49. Engine system 10 and exhaust system 35 may also include an exhaust temperature sensor 74 structured to produce an exhaust temperature signal indicative of a temperature of exhaust cooled in exhaust condenser 50 and/or heat exchanger 40. An EGR temperature controller 76 is coupled with coolant temperature sensor 72 by way of a communication line 73, and with exhaust temperature sensor 74 by way of a communication line 75. A fill sensor 78, which could include a float sensor or the like, may be coupled with condensate collector 54 and structured to produce a fill state signal indicative of a fill state of condensate collector 54. Fill sensor 78 and EGR temperature controller 76 may be coupled by way of a communication line 79. EGR temperature controller 76 can include any suitable electronic controller having a central processing unit or CPU, such as a microprocessor, a microcontroller, or a field programmable gate array (FPGA). EGR temperature controller 76 can also include computer readable memory such as RAM, ROM, DRAM, SDRAM, FLASH, or still another memory storing computer executable instructions for controlling a temperature of recirculated exhaust gas based on flows of coolant and flow and spraying of condensate. EGR temperature controller 76 may be structured to output a pump speed command to first coolant pump 48, another pump speed command to condensate pump 57, and potentially a pump speed command to second coolant pump 51 based on the coolant temperature signal and the exhaust temperature signal and potentially also the fill state signal.

In one embodiment, where the fill state signal indicates condensate collector 54 is empty or below some fill state threshold, EGR temperature controller 76 could command an increased pump speed of coolant pump 48 based on unavailability or expected unavailability of condensate to cool coolant in coolant heat exchanger 60 and cool exhaust by way of vaporizing condensate on second heat exchange surface 43. Where the fill state signal indicates condensate is plentiful, a pump speed signal or a pump starting signal could be sent to condensate pump 57 to take advantage of the availability of plentiful condensate for exchanging heat with both coolant and exhaust. Where the exhaust temperature signal indicates exhaust temperature is less than desired, or below some suitability threshold, pump speed commands could be sent to first coolant pump 48, second coolant pump 51, or to condensate pump 57 to allow exhaust temperature to rise. Where exhaust temperature is indicated by the exhaust temperature signal to be higher than desired, pump speed commands can be sent to one or both of first and second coolant pumps 48 and 51 and/or to condensate pump 57 to increase cooling of the exhaust. EGR temperature controller 76 can also receive an intake manifold temperature signal from an intake manifold temperature sensor 82, an engine speed signal from an engine speed sensor 80, or various other inputs. EGR temperature controller 76 could also be structured to control parameters other than EGR temperature, such as EGR flow by outputting control commands to EGR valve 38 and/or to butterfly valve 34. In general terms, coolant pumping speed and condensate pumping speed can be increased to increase overall exhaust cooling efficacy, or decreased to decrease overall exhaust cooling efficacy, with cooling burden divided between condensate and coolant based at least in part upon availability of condensate. In typical operation, exhaust gas recirculation will not be used at all until engine system 10 reaches some load threshold, for example, about 20% of a maximum or rated engine load, and once exhaust recirculation is initiated there may be some time delay until condensate becomes available for use.

INDUSTRIAL APPLICABILITY

Exhaust temperatures can vary relatively widely, but when exhaust gas recirculation is to be used a temperature of exhaust entering EGR conduit 36 through exhaust inlet 39 might be about 400° C. It might be desired for coolant pumped through heat exchanger 40 to be about 100° C. at coolant inlet 46, and increased to about 120° C. at coolant outlet 47. The coolant having passed through heat exchanger 40 and exchanged heat with the hot exhaust therein can be conveyed at the approximately 120° through coolant heat exchanger 60 and coolant heat exchanger 63. Condensate pumped through coolant heat exchanger 60 may be at about 40° C. at inlet 61, and increased in temperature by exchanging heat with coolant in coolant heat exchanger 60 to about 60° C. at outlet 62. The condensate sprayed by way of sprayer 64 onto second heat exchange surface 43 may therefore be sprayed at about 60° C. and then vaporized upon contact with second heat exchange surface 43, itself having a temperature close to a temperature of exhaust conveyed through EGR conduit 36. A temperature of coolant conveyed through EGR condenser 50 might be about 35° C. when pumped into EGR condenser 50, and increased to about 60° C. after exchanging heat with the exhaust in EGR condenser 50. A temperature of condensate in condensate collector 54 might be about 40° C., corresponding approximately to a temperature of the exhaust having been cooled in exhaust condenser 50 and cooled upstream of exhaust condenser 50 in heat exchanger 40. A temperature of the exhaust after cooling in heat exchanger 40 might be about 150° C. EGR temperature controller 76 could control pump speeds as discussed herein in view of these general temperature targets, however, the present disclosure is not thereby limited. At coolant temperature sensor 72 a desired temperature of the coolant might be about 100° C., for feeding into coolant inlet 46 at a similar temperature, however, it should be appreciated that other cooling mechanisms such as an additional or larger heat exchanger might be positioned in first coolant loop 49 to further cool coolant entering heat exchanger 40.

Figure 2:
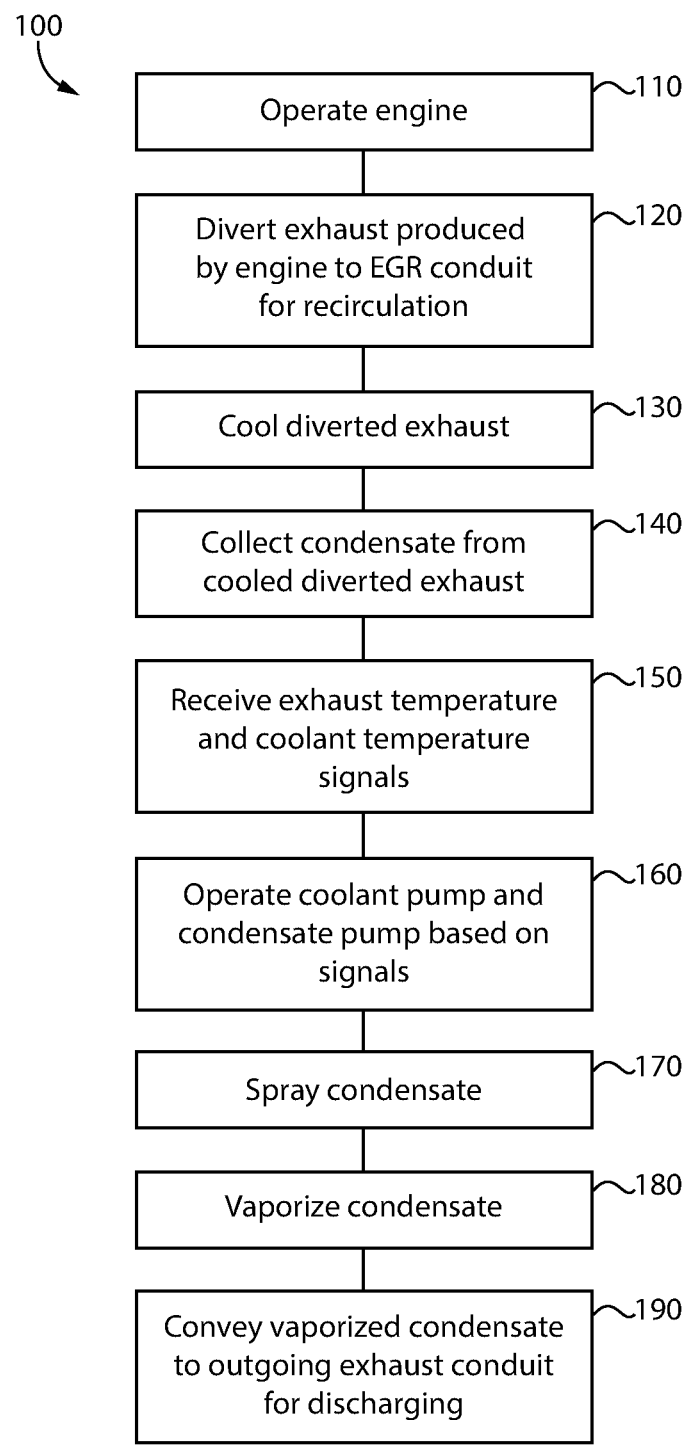
FIG. 2 is a flowchart illustrating process and logic flow, according to one embodiment.

Referring also now to FIG. 2, there is shown a flowchart 100 illustrating example process and logic flow according to one embodiment, and starting at a block 110 where engine system 10 is operated to combust fuel and air in cylinders 14, for instance, in a conventional four-cycle pattern. At an appropriate timing, exhaust gas recirculation can commence by diverting exhaust produced by engine system 10 to EGR conduit 36 for recirculation as shown at a block 120. From block 120, the process can advance to a block 130 to cool the diverted exhaust as discussed herein, and thenceforth to a block 140 to collect condensate from cooled diverted exhaust.

From block 140, the process may advance to a block 150 to receive exhaust temperature and coolant temperature signals as discussed herein. From block 150 the process can advance to a block 160 where EGR temperature controller 76 operates one or both of first and second coolant pumps 48 and 51 and condensate pump 57 based on the exhaust temperature and coolant temperature signals. From block 160, the process can advance to a block 170 to spray the collected condensate onto heat exchange surface 43 in exhaust system 35, and thenceforth to a block 180 where the condensate is vaporized on the second heat exchange surface 43. The vaporized condensate is conveyed into outgoing exhaust conduit 32. In a practical implementation strategy sprayer 64 may operate to atomize and spray the collected condensate based on operation of condensate pump 57. Accordingly, when condensate pump 57 operates, some spray of condensate out of sprayer 64 can be expected, and when condensate pump 57 is idled no spraying will occur. In other implementations sprayer 64 could be directly operated, such as by way of an actuator to control the spray separately from or in cooperation with operating of condensate pump 57. Discharging vaporized condensate through outgoing exhaust conduit 32 can eliminate the need to store condensate on-board, or discharge it in a liquid form, such as to specialized processing equipment or only at limited occasions The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an exhaust system for an internal combustion engine comprising:
    diverting exhaust produced by the internal combustion engine for recirculation;
    cooling the diverted exhaust;
    collecting condensate from the cooled diverted exhaust;
    spraying the collected condensate onto a heat exchange surface in a heat exchanger in the exhaust system;
    vaporizing the collected condensate sprayed onto the heat exchange surface based on an exchange of heat between the collected condensate and diverted exhaust conveyed through the heat exchanger;
    conveying the vaporized condensate into an outgoing exhaust conduit of the exhaust system for discharging;
    the cooling of the diverted exhaust further includes cooling the diverted exhaust in an exhaust gas recirculation (EGR) cooler and an EGR condenser, and the collecting of the condensate further includes collecting the condensate from diverted exhaust conveyed through the EGR condenser; and
    the cooling of the diverted exhaust further includes exchanging heat between the diverted exhaust and coolant liquid in a first coolant loop through the EGR cooler, and exchanging heat between the diverted exhaust and coolant liquid in a second coolant loop through the EGR condenser that is fluidly in parallel with the first coolant loop.

2. The method of claim 1 further comprising precooling the coolant liquid in the first coolant loop prior to pumping the coolant liquid through the EGR cooler at least in part by exchanging heat between the coolant liquid and the collected condensate.

3. The method of claim 2 wherein the precooling of the coolant liquid in the first coolant loop includes exchanging heat between the coolant liquid and the collected condensate in a first coolant heat exchanger, and exchanging heat between the coolant liquid and additional coolant liquid in a second coolant heat exchanger.

4. The method of claim 1 wherein the spraying of the collected condensate further includes spraying the collected condensate onto a heat exchange surface in the EGR cooler.

5. An internal combustion engine system comprising:
    an exhaust gas recirculation (EGR) conduit;
    an outgoing exhaust conduit;
    a heat exchanger having a first heat exchange surface exposed to a flow of exhaust through the EGR conduit, and a second heat exchange surface in heat transference communication with the first heat exchange surface;
    a condensate collector coupled to the EGR conduit to collect condensate from the exhaust;
    a sprayer structured to spray condensate from the condensate collector onto the second heat exchange surface; and
    a vapor conduit extending between the heat exchanger and the outgoing exhaust conduit to convey condensate vaporized on the second heat exchange surface to the outgoing exhaust conduit for discharging; and
    the heat exchanger includes an EGR cooler, and further comprising a coolant heat exchanger, a coolant pump, and a condensate pump structured to pump condensate from the condensate collector through the coolant heat exchanger to exchange heat with coolant pumped through the coolant heat exchanger.

6. The system of claim 5 wherein the EGR cooler includes a coolant inlet and a coolant outlet, and wherein the coolant heat exchanger is fluidly connected to the coolant outlet and the coolant pump is fluidly connected to the coolant inlet.

7. The system of claim 5 including an intake conduit for the internal combustion engine, an EGR inlet and a gaseous fuel inlet each opening to the intake conduit.

8. An internal combustion engine system comprising:
    an exhaust gas recirculation (EGR) conduit;
    an outgoing exhaust conduit;
    a heat exchanger having a first heat exchange surface exposed to a flow of exhaust through the EGR conduit, and a second heat exchange surface in heat transference communication with the first heat exchange surface;
    a condensate collector coupled to the EGR conduit to collect condensate from the exhaust;
    a sprayer structured to spray condensate from the condensate collector onto the second heat exchange surface;
    a vapor conduit extending between the heat exchanger and the outgoing exhaust conduit to convey condensate vaporized on the second heat exchange surface to the outgoing exhaust conduit for discharging; and further comprising an EGR condenser, a first coolant loop through the heat exchanger, a second coolant loop through the EGR condenser that is fluidly in parallel with the first coolant loop, and a second coolant pump structured to pump coolant through the second coolant loop.

9. The system of claim 8 further comprising a coolant temperature sensor structured to produce a coolant temperature signal indicative of a temperature of coolant cooled in the coolant heat exchanger.

10. The system of claim 9 further comprising an exhaust temperature sensor structured to produce an exhaust temperature signal indicative of a temperature of exhaust cooled in the exhaust condenser.

11. The system of claim 10 further comprising an EGR temperature controller structured to vary a pumping speed of at least one of the first coolant pump or the condensate pump based on the exhaust temperature signal and the coolant temperature signal.

12. The system of claim 11 further comprising a condensate collector, and a fill sensor coupled with the condensate collector and structured to produce a fill state signal indicative of a fill state of the condensate collector.

13. An exhaust system for an internal combustion engine comprising:

an exhaust gas recirculation (EGR) conduit;

an EGR cooler including an exhaust heat exchange surface exposed to a flow of exhaust through the EGR conduit, and a second heat exchange surface, a coolant inlet, and a coolant outlet;

a coolant heat exchanger fluidly connected to the coolant outlet;

a coolant pump fluidly connected to the coolant inlet;

a condensate collector coupled to the EGR conduit to collect condensate from the exhaust;

a sprayer structured to spray condensate from the condensate collector onto the second heat exchange surface to vaporize the condensate for discharging; and a condensate pump structured to pump condensate from the condensate collector to the sprayer; and further comprising an EGR condenser, and an exhaust temperature sensor structured to produce an exhaust temperature signal indicative of a temperature of recirculated exhaust cooled in the EGR cooler and the EGR condenser.

14. The exhaust system of claim 13 further comprising a coolant temperature sensor structured to produce a coolant temperature signal indicative of a temperature of coolant cooled in the coolant heat exchanger.

15. The exhaust system of claim 13 further comprising an EGR temperature controller structured to vary a pumping speed of at least one of the coolant pump or the condensate pump based on the exhaust temperature signal and the coolant temperature signal.

* * * * *